3,372,186
MANGANESE CHLORIDE TETRAHYDRATE AS AN ESTER INTERCHANGE CATALYST

William L. Hergenrother, Akron, Ohio, assignor to The Firestone Tire & Rubber Company, Akron, Ohio, a corporation of Ohio
No Drawing. Filed June 1, 1965, Ser. No. 460,477
8 Claims. (Cl. 260—475)

This invention relates, as indicated, to the production of precondensate or prepolymer compositions useful in the production of high molecular weight polyesters, and more particularly to the production of polymerizable esters of aromatic dicarboxylic acids and glycols useful as prepolymers to the production of polyesters, e.g. poly (ethylene terephthalate), by condensation.

The production of high molecular weight polyesters proceeds, in general, through two stages which more-or-less shade into each other. First, there is a precondensation or prepolymer stage in which mono- and di-esters of the glycols with dicarboxylic acids are formed along with varying amounts of low molecular weight polymers and having an average molecular weight of no more than 1000. Second there is a condensate stage or polymer stage wherein the precondensate or prepolymer of the first stage is further condensed or polymerized to form high molecular weight polymeric chains. Various catalytic agents of greater or less efficiency have been proposed for each of these reactions. The requirements for such catalysts are rather exacting; they must be inexpensive, of low toxicity, readily handled in the reaction system or apparatus, and they must not adversely affect the appearance, physical properties, or stability of the ultimate polymeric products.

It has been found that manganous chloride tetrahydrate meets the exacting requirements for catalysts useful in the preparation of precondensation or prepolymer compositions as precursors to the production of polyesters. Accordingly, the present invention is primarily concerned with the provision of an improved catalytic ester interchange process for producing a suitable precondensate or prepolymer in which the catalytic material meets the requirements of a suitable catalyst for these materials.

Briefly stated, then, the present invention is in a process for the formation of a prepolymer composition which includes a polymerizable glycol ester of an aromatic dicarboxylic acid, e.g. terephthalic acid, by a catalyzed ester interchange reaction carried out by heating in monohydric alcohol ester of a dicarboxylic acid with a glycol, e.g. ethylene glycol in the presence of at least a catalytic amount of a manganous salt of a halogen acid, and removing the evolved alcohol from the system.

As indicated above, the preparation of high molecular weight polyesters proceeds by way of two more or less overlapping stages (1) the initial formation of low molecular weight esterification products, followed by (2) the polycondensation stage. The manganous halide catalyst of the present invention is of particular use in stage (1) and may be present in stage (2) provided there is no unfavorable interaction with the particular catalyst, materials or conditions employed in the second stage. For example, the catalytic material for the second stage may be antimony trisulfide ($Sb_2S_3$). It is preferred to withhold the antimony trisulfide catalyst until after the completion of initial stage (1).

The first stage is carried out by effecting an ester interchange in the presence of the catalysts of this invention and at an elevated temperature, between a lower alkyl ester of the dicarboxylic acid, and the appropriate glycol.

Dicarboxylic acids which may enter into the preparation of the precondensates or prepolymers include the preferred symmetrical aromatic dicarboxylic acids, such as terephthalic acid, p,p'-diphenyl ether dicarboxylic acid; p,p'-diphenyl sulfone dicarboxylic acid; p,p'-diphenyl dicarboxylic acid, and the like. However, other types of acids may also be used, such as the isophthalic acid and aliphatic dicarboxylic acids such as adipic acid, sebacic acid, azelaic acid, suberic acid and the like. These acids are converted to the lower alkyl esters by conventional procedures, such esters being dimethyl esters, diethyl esters, dipropyl esters, dibutyl esters, diamyl esters, dihexyl esters, and diheptyl esters. Specific examples of monohydric alcohol esters include, therefore, dimethyl terephthalate, dimethyl-p,p'-diphenyl ether dicarboxylate; dimethyl-p,p'-diphenyl sulfone dicarboxylate; dimethyl-p,p'-diphenyl dicarboxylate; diethyl terephthalate; diethyl-p,p'-diphenyl ether dicarboxylate; dipropyl terephthalate; dibutyl terephthalate; diamyl terephthalate; dihexyl terephthalate; diheptyl terephthalate, and the like. Branched chain alcohols containing from 3 to 7 carbon atoms may also be used and are often preferred because of their greater ease of removal. For most purposes, however, the dimethyl terephthalate is used as the reactant from which the glycol terephthalate is subsequently formed.

The lower alkyl esters of the dicarboxylic acid are, as indicated above, reacted with suitable glycols by an ester interchange process in the presence of the manganous salt catalyst of the present invention to form the precondensate, or prepolymers, in accordance with the present invention. Suitable glycols include, for instance, the preferred polymethylene glycols containing from 2 to 12 carbon atoms, such as, ethylene glycol, 1,3-dihydroxy propylene; 1,6-dihydroxy hexane; 1,8-dihydroxy octane; 1,12-dihydroxy dodecane, and the like. However, there may also be employed branched chain glycols, such as 1-methyl-1,2-dihydroxy propane; 2,2-dimethyl-1,3-dihydroxy propane, and the like.

THE FORMATION OF THE PREPOLYMER

As indicated above, the lower alkyl ester of the dicarboxylic acid may be formed by any suitable conventional process. The prepolymer is formed by reacting one of the aforementioned glycols with one of the aforementioned lower alkylesters of the dicarboxylic acid in the presence of a catalytic amount of manganous chloride tetrahydrate while continuously removing from the reaction system the monohydric alcohol released by the ester interchange. As to the amount of the catalyst, manganous chloride tetrahydrate, any finite amount will accelerate the ester interchange to some degree. In general, there will be employed at least about 0.005%, and preferably at least about 0.02% of the manganese chloride tetrahydrate, based on the weight of the reactant materials. The molar ratio of the glycol to the lower alkyl ester of the dicarboxylic acid is preferably at least 2:1; although molar ratios of from 1:1 to 3:1 may be used if desired. The reactant materials are placed in a suitable reaction vessel, such as a flask, fitted with a stirrer, means for heating the reaction vessel, for example, a conventional electric mantle type heater, or a steam jacket, surrounding the vessel, and means for removing, and preferably recovering, monohydric alcohol evolved, and water evolved in the course of the reaction. Such equipment is entirely conventional. With respect to the amount of the catalyst, there is no critical technological upper limit, but increments greater than 1% will not greatly further increase the rate of reaction, and will generally be found uneconomic.

The reaction mixture is heated to a temperature between the boiling point of the glycol and the boiling point of the monohydric alcohol from which the lower molecular weight ester has been formed. The reaction of this invention may be carried out at ordinary atmospheric pressure, or super atmospheric pressures, or subatmospheric pressures. Alternatively, the pressure of the reactions system may be varied during the course of the reaction from a super atmospheric pressure through atmospheric pressure to subatmospheric pressure to promote the rate and extent of the ester interchange. Reduced pressures at the terminal portion of the interchange reaction are preferred to aid in the removal of not only water but also of evolved monohydric alcohol. After the formation of the prepolymer by the process above described, without removing the prepolymer, or precondensate, from the reaction system, a condensation catalyst may be added such as antimony trisulfide in the amount of at least about 0.005% and preferably at least about 0.1% by weight of the prepolymer, the temperature elevated to from 200° C. to 285° C. in which range the evolution of glycol vapors at atmospheric pressure occurs. After the evolution of such glycol vapors ceases, the pressure should then be lowered progressively the ultimate absolute pressure desirably being of the order of 1.0 mm. or less of mercury. When the polycondensation or polymerization reaction has been carried out to the desired degree, that is such that the intrinsic viscosity of the polymer has been raised to above 0.25 and preferably above 0.9, the conditions resulting in condensation are discontinued, and the molten high polymeric removed and either directly spun, extruded, passed, or otherwise formed into the desired final form; or else cooled to solidify the polymer for storage and/or shipment. The polymerization reaction, or second stage of the reaction proceeds quite rapidly, usually being completed to the desired degree within from about 2 to about 5 hours, and the product will be found to have good color and to be stable against degradation by heat, light, atmosphere or other deteriorating influences. With the foregoing general discussion in mind, there are given herewith detailed experimental examples of the practice of the process of this invention for the production of the prepolymer. All parts given are by weight unless otherwise explicitly indicated.

Example 1

| | Parts |
|---|---|
| Dimethyl terephthalate | 97 |
| Ethylene glycol | 62 |
| Manganous chloride tetrahydrate | .039 |
| Antimony trisulfide | .040 |

For this preparation there was provided a 200 ml. flask provided with a molten metal heating bath, a sparger for introducing nitrogen, a stirrer, and an offtake provided with a condenser. The dimethyl terephthalate, ethylene glycol, and manganous chloride tetrahydrate were charged first to the flask, and the temperature raised to 185° C. at which point methanol began to be evolved. After 2 hours, 35 cc. (88%) of the methanol had been collected.

Thereafter, .040 part of antimony trisulfide were added and the temperature raised to 275° C. The pressure was reduced and the reaction continued for a period of three hours at 275° C.–285° C. under a pressure of 0.10 mm.–0.15 mm. of mercury. Upon cooling, a grey white polyester was obtained having an intrinsic viscosity of 0.96.

Example 2

To a ten gallon stainless steel reactor, well flushed with nitrogen, were charged 29.18 lbs. of dimethyl terephthalate, 18.60 lbs. of ethylene glycol and 5.34 grams of manganous chloride tetrahydrate. Heating of the kettle was begun through the "Dowtherm" in the jacket. When the dimethyl terephthalate was melted, the anchor agitator was turned on and heating was continued to a kettle temperature of 370° F. Methanol began distilling over quite freely at 300° F. and within six hours the methanol evolution had ceased. The reactor was held at this temperature for an additional ten hours before being raised to 430° F. At this point 5.49 grams of antimony trisulfide were added to the kettle. When the batch temperature reached 500° F. vacuum was slowly applied to the system. After five to six hours at 500° F.–550° F. and 600–800 microns of mercury pressure, the melt viscosity of the polymer was such that the kettle agitator could scarcely stir. Nitrogen was then bled back into the kettle and the polymer pressured out with 85 p.s.i. nitrogen. The white polyester was ground in a Wiley Mill and had an intrinsic viscosity of 0.77 as determined in a 1:1 mixture of phenol tetrachloroethane.

From the foregoing examples it will be clear that other specific examples illustrating the use of other reactants as precursors to the formation of a prepolymer material could be recited without altering the steps of the process. Other materials may be treated in the same manner with the same quantities of the manganous chloride tetrahydrate catalyst. The temperatures of reaction will, of course, be somewhat different in view of the difference in boiling points of different glycols and the alcohols which may be used. In all of the respects, the procedure with such other materials remains essentially the same.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. In a process for the formation of a polymerizable glycol ester of an aromatic dicarboxylic acid in a prepolymer composition for high molecular weight poly(alkylene aromatic dicarboxylate) by an ester interchange reaction between an alkyl monohydric alcohol ester of said dicarboxylic acid and an alkylene glycol, the improvement which comprises heating said alkyl monohydric alcohol ester of said dicarboxylic acid with an excess of an alkylene glycol in the presence of a catalytic amount of manganese chloride tetrahydrate and removing the resulting monohydric alcohol from the reaction mass.

2. In a process for the formation of a polymerizable glycol ester of terephthalic acid in a prepolymer composition for high molecular weight poly(alkylene terephthalate) by an ester interchange reaction between an alkyl monohydric alcohol ester of terephthalic acid and an alkylene glycol, the improvement which comprises heating said alkyl monohydric alcohol ester of terephthalic acid with an excess of an alkylene glycol in a reaction system at a temperature above the boiling point of the monohydric alcohol in the system and below the boiling point of the glycol in the system in the presence of a catalytic amount of manganese chloride tetrahydrate and removing the resulting monohydric alcohol from the reaction system.

3. The improved process of claim 2 in which the reaction system is maintained at subatmospheric pressure.

4. The improved process of claim 2 in which the monohydric alcohol contains from 1 to 7 carbon atoms.

5. The improved process of claim 2 in which the alkyl monohydric alcohol ester of terephthalic acid is dimethyl terephthalate.

6. The improved process of claim 2 in which the alkylene glycol is a $C_2$ to $C_{12}$ alkylene glycol.

7. The improved process of claim 2 in which the alkylene glycol is ethylene glycol.

8. In a process for the formation of a polymerizable ethylene glycol ester of terephthalic acid in a prepolymer composition for high molecular weight poly(ethylene terephthalate) by an ester interchange reaction between dimethyl terephthalate and ethylene glycol, the improvement which comprises heating said dimethyl terephthalate with an excess of ethylene glycol in a reaction vessel at subatmospheric pressure in the presence of from 0.005% to 0.1% by weight of the total weight of the reactants of manganous chloride tetrahydrate and removing methyl alcohol from the reaction system.

References Cited

UNITED STATES PATENTS 3,010,991  11/1961  Meyer _____ 260—475

LORRAINE A. WEINBERGER, *Primary Examiner.*

T. L. GALLOWAY, *Assistant Examiner.*